Patented July 10, 1951

2,560,045

UNITED STATES PATENT OFFICE 2,560,045

RUBBER VULCANIZATION

George E. P. Smith, Jr., Akron, Ohio, assignor to The Firestone Tire & Rubber Company, Akron, Ohio, a corporation of Ohio No Drawing. Application June 21, 1949, Serial No. 100,548

3 Claims. (Cl. 260—788)

This invention relates to the vulcanization of a rubber in the presence of a new class of chemical compounds which are valuable accelerators for the vulcanization of natural or synthetic vulcanizable rubbers. This application is a continuation-in-part of my copending application Serial No. 543,054, filed June 30, 1944, now abandoned.

The objects of the invention are to provide a method of vulcanizing a rubber whereby scorching or pre-vulcanization during processing of the rubber composition is prevented, but extremely rapid vulcanization is obtained at customary vulcanizing temperatures; to provide rubber compositions possessing the ability to vulcanize extremely rapidly at ordinary vulcanizing temperatures, but free from any tendency to set-up or pre-vulcanize at rubber processing temperatures; to provide a vulcanized rubber of improved quality, possessing the characteristics of high modulus and tensile, low hysteresis and a high inherent resistance to deterioration by flexing or aging.

The above and further objects will be manifest in the description of the invention which follows.

The objects of the invention are realized through the discovery and use of a new class of chemical compounds which are derivatives of sulfenamide ($HSNH_2$). The compounds may be conveniently prepared by oxidizing a mixture of a 2-mercapto-thiazole and a primary amine containing an alkenyl radical. The oxidation may be effected by treating a mixture of the amine and the mercaptothiazole in an alkaline aqueous medium with an oxidizing agent, such as chlorine, bromine, iodine, hypochlorous acid, hypobromous acid, hypoiodous acid, or alkali metal or alkaline earth metal salts of said acids. The new class of products produced possesses the following formula:

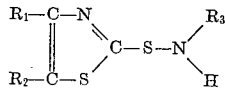

wherein $R_1$ and $R_2$ are hydrogen or radicals derived from hydrocarbons or together represent a cyclic radical, and $R_3$ is an alkenyl or cycloalkenyl radical.

Examples of amines which may be used in forming the accelerators include the following:

Allyl amine
Crotonyl amine
Gamma methyl crotonyl amine
Isobutenyl amine
2,3,4,5-tetrahydrobenzyl amine
Alpha,beta-dimethylallyl amine
Beta,gamma-cyclohexenyl amine
Gamma,delta-butenyl amine
Gamma,delta-cyclohexenyl amine
Isopropenyl amine
Alpha,beta-cyclohexenyl amine
Isocrotonyl amine The 2-mercaptothiazole employed may be an aromatic thiazole, wherein $R_1$ and $R_2$ of the above formula represents an ortho-arylene radical. Examples of ortho-arylene radicals include benzo, 4-phenylbenzo, 6-phenylbenzo, naphtho, and homologs or the various ring substitution products of these radicals; as typical ring substituents there may be mentioned nitro, halogen, hydroxy and alkoxy groups. $R_1$ and $R_2$ may together form a non-aromatic divalent radical, such as the various hydrogenated or partially hydrogenated benzo radicals; examples of mercaptothiazoles of this type are 2-mercaptotetrahydro-benzothiazole and ring substitution products thereof. The mercaptothiazole may, however, be a member of the so-called non-aromatic thiazoles, some examples being the following:

2-mercaptothiazole
2-mercapto-4-methyl-thiazole
2-mercapto-4,5-dimethyl-thiazole
2-mercapto-4-ethyl-thiazole
2-mercapto-4-phenyl-thiazole
2-mercapto-4-phenyl-5-methyl-thiazole
2-mercapto-4-propyl-thiazole The following examples are given in further illustration of the invention.

Example 1

To 10.75 grams of commercial 2-mercaptobenzothiazole there were added 5.5 grams of solid sodium hydroxide dissolved in about 100 ml. of water. After reaction was complete the solution was filtered. The resulting clear solution of the mercaptothiazole was mixed with 42.5 grams of primary isobutenyl amine, and the mixture was diluted with about 300 ml. of water. The alkaline mixture was then treated with a solution of 15.2 grams of iodine and 20 grams of potassium iodide in water, by adding the oxidizing iodine solution dropwise to the agitated alkaline mixture. A white solid precipitated during the addition of the iodine. After the addition of all the iodine, the precipitate was collected, washed with water and dried, resulting in 9.5 grams of product. The latter was purified by recrystallization from petroleum ether. The purified substance melted at 64–66° and is N-isobutenyl-2-benzothiazole sulfenamide, having the formula

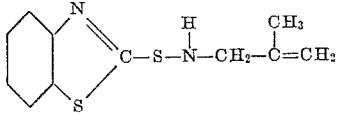

The purified product analyzed 11.76% nitrogen and 26.97% sulfur; the values calculated from the above formula are 11.86% nitrogen and 27.13% sulfur.

The sulfenamide, so prepared, was tested as an accelerator by comparing it with the standard accelerators, mercaptobenzothiazole and 2,2'-dithiobis-benzothiazole, the latter being a delayed action accelerator, in the following rubber formula Ingredients: Parts by weight
  Rubber (smoked sheets) _____ 100.00
  Sulfur _____ 3.00
  Zinc oxide _____ 5.00
  Stearic acid _____ 1.10
  Accelerator _____ 0.75

Samples of the three rubber compositions, so formulated, were heated for 60 minutes at 240° F. to determine whether or not they possessed any tendency to pre-vulcanize or set-up during processing steps prior to the usual vulcanizing step, and the following physical testing data were obtained:

| Accelerator | Modulus of Elasticity in lbs./in.² at elongation of 600% | Tensile Strength in lbs./in.² at break |
|---|---|---|
| Mercaptobenzothiazole | 750 | 2,800 |
| 2,2'-Dithiobis-benzothazole | No cure | No cure |
| N-Isobutenyl-2-benzothiazole sulfenamide | No cure | No cure |

Other samples of the aforesaid rubber compositions were heated for 40 minutes at 280° F. to determine the relative accelerating properties of the respective accelerators and the following data were obtained:

| Accelerator | Modulus of Elasticity in lbs./in.² at elongation of 600% | Tensile Strength in lbs./in.² at break |
|---|---|---|
| Mercaptobenzothiazole | 650 | 2,700 |
| 2,2'-Dithiobis-benzothiazole | 750 | 3,150 |
| N-Isobutenyl-2-benzothiazole sulfenamide | 2,000 | 3,675 |

The two sets of testing data given above show that the sulfenamide derivative from isobutenylamine and mercaptobenzothiazole is an excellent delayed-action accelerator, since the rubber composition including it did not vulcanize at the relatively low temperature of 240° F., in contrast with the composition including the standard accelerator, mercaptobenzothiazole. Furthermore, the new accelerator imparted very high physical properties to the rubber composition after a short cure at 280° F., in comparison with mercaptobenzothiazole and the standard delayed-action accelerator 2,2'-dithiobis-benzothiazole.

*Example 2*

To 57.09 grams (1.00 mole) of allylamine there was added slowly and with stirring, at a temperature of −10° C., 210 ml. of 2.91 molar sodium hypochlorite solution (0.625 mole). As soon as the addition of the hypochlorite solution was complete, 350 ml. of an aqueous solution of 0.5 mole of the sodium salt of 2-mercaptobenzothiazole was added to the cold reaction mixture. The solid reaction product precipitated and was separated by filtration. After several recrystallizations from gasoline the product melted sharply at 61–62° C. The product, N-allyl-2-benzothiazole sulfenamide, has the following structure:

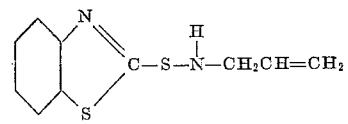

In accordance with either the method of Example 1 or the method of Example 2, crotonyl amine may be reacted with 2-mercaptobenzothiazole to produce N-crotonyl-2-benzothiazole sulfenamide of the following formula:

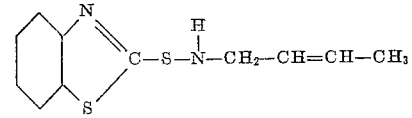

These two additional sulfenamides are excellent delayed-action accelerators, having similar properties to N-isobutenyl-2-benzothiazole sulfenamide. Other sulfenamides of the invention may be prepared in analogous manners by oxidizing the mercaptothiazole with the appropriate primary amine, or by reacting the disulfide of the mercaptothiazole with the amine. Thus, for example, the following active delayed-action accelerators may be so produced:

N-tetrahydrobenzyl-2-thiazole sulfenamide
N-isobutenyl-2-tetrahydrobenzothiazole sulfenamide The invention is not limited to derivatives prepared in accordance with any particular method, but includes vulcanization in the presence of the preferred class of chemical compounds, however they may have been manufactured.

The new accelerators are equally effective in rubber tread compounds, latex compounds or other conventional vulcanizable compounds of rubber or synthetic rubber. The various vulcanizable synthetic rubbers are herein considered equivalent to rubber, examples being the rubbery polymers essentially derived from 1,3-butadiene, such as copolymers of butadiene and acrylonitrile and copolymers of butadiene and styrene. Other examples are polybutadiene rubber, polyisoprene synthetic rubbers and rubbery copolymers of a butylene and a diolefin. Although sulfur has hereinabove been mentioned as the vulcanizing agent preferred in practicing the invention, other conventional sulfur-bearing vulcanizing agents susceptible to acceleration are contemplated, such as the so-called "sulfur donor" type of vulcanizing agents, of which tetramethylthiuram disulfide, polysulfides of phenols and cresols, and diethyl xanthogen disulfide are well-known examples. The accelerators of the invention accelerate the vulcanization of a rubber by means of such sulfur donors even though no added free sulfur is present in the rubber composition. Whether the sulfur donors break down to give free sulfur during the vulcanizing step is unknown, but they do contain sulfur and the invention is considered to cover their use as well as the use of free sulfur.

The preferred compounds are seen to be very rapid accelerators at conventional vulcanizing temperatures, imparting unusually high modulus and tensile characteristics to the vulcanized rubber, but they are of the delayed action type, in that vulcanizable compositions including them do not set-up or pre-vulcanize under conventional rubber processing conditions. The vulcanized products are also highly efficient, having low hysteresis characteristics, and are unusually resistant to deterioration on flexing or aging.

Conventional accelerator activators may be employed to an advantage with the new class of accelerators when extremely rapid vulcanization is desired, especially at lower temperatures. Also, the new accelerators may be used in combination with other accelerators, such as a guanidine (e. g., diphenyl guanidine) or a conventional mercaptothiazole derivative (e. g., mercaptobenzothiazole or 2,2'-dithiobis-benzothiazole), in order to produce rubber compositions having especially rapid or specific vulcanizing properties.

What is claimed is:

1. The method of vulcanizing rubber which includes heating a rubber and sulfur in the presence of N-isobutenyl-2-benzothiazole sulfenamide.
2. A vulcanizable rubber composition including sulfur and N-isobutenyl-2-benzothiazole sulfenamide.
3. A vulcanized rubber product prepared by heating a rubber and sulfur in the presence of N-isobutenyl-2-benzothiazole sulfenamide.

GEORGE E. P. SMITH, Jr.

REFERENCES CITED

The following references are of record in the file of this patent:

UNITED STATES PATENTS

| Number | Name | Date |
|---|---|---|
| 2,268,467 | Ashworth | Dec. 30, 1941 |
| 2,339,552 | Carr | Jan. 18, 1944 |
| 2,417,989 | Moore et al. | Mar. 25, 1947 |
| 2,445,722 | Carr et al. | July 20, 1948 |
| 2,460,393 | Paul | Feb. 1, 1949 |